United States Patent
Wang et al.

(10) Patent No.: US 9,300,736 B2
(45) Date of Patent: Mar. 29, 2016

(54) DISPLAY CONTROL METHOD AND DEVICE

(71) Applicant: Tencent Technology (Shenzhen) Company Limited, Shenzhen (CN)

(72) Inventors: Xuxin Wang, Shenzhen (CN); Jianhui Yao, Shenzhen (CN); Xianwen Chen, Shenzhen (CN); Wen Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 324 days.

(21) Appl. No.: 14/080,689

(22) Filed: Nov. 14, 2013

(65) Prior Publication Data
US 2014/0074918 A1    Mar. 13, 2014

Related U.S. Application Data

(63) Continuation of application No. PCT/CN2013/083345, filed on Sep. 11, 2013.

(30) Foreign Application Priority Data

Sep. 13, 2012 (CN) .......................... 2012 1 0338434

(51) Int. Cl.
G06F 17/00 (2006.01)
G06F 19/00 (2011.01)
(Continued)

(52) U.S. Cl.
CPC ................ *H04L 67/104* (2013.01); *G06F 7/58* (2013.01); *G06F 7/582* (2013.01); *G06F 9/44* (2013.01); *G07F 17/3225* (2013.01); *G07F 17/3227* (2013.01); *A63F 2300/535* (2013.01)

(58) Field of Classification Search
USPC .......................................................... 463/22
See application file for complete search history.

(56) References Cited

U.S. PATENT DOCUMENTS 4,582,324 A * 4/1986 Koza ........................ A63F 13/12
                                                             463/16
5,779,545 A * 7/1998 Berg .................... G07F 17/3223
                                                             463/22

(Continued)

FOREIGN PATENT DOCUMENTS

CN        1519717 A      8/2004
CN        1885774 A     12/2006

(Continued)

OTHER PUBLICATIONS

Tencent Technology, ISRWO, PCT/CN2013/083345, Dec. 19, 2013, 10 pgs.

(Continued)

*Primary Examiner* — Steven J Hylinski
(74) *Attorney, Agent, or Firm* — Morgan, Lewis & Bockius LLP

(57) ABSTRACT

The current invention discloses methods and devices that provide controlled randomization of the progression of an application program on one or more terminals connected to a server. The server may feed a seed random number to the terminals and the seed random number may be used by a platform-independent random number generator to produce random numbers. The random numbers may be fed to platform-dependent random processing commands to generate display contents, which may be displayed by the terminals. With such implementations, the same program running at different times may have different processes and show different display contents. The current invention reduces predictability and improves randomness and excitability of the program.

17 Claims, 7 Drawing Sheets

(51) Int. Cl.
*H04L 29/08* (2006.01)
*G07F 17/32* (2006.01)
*G06F 7/58* (2006.01)
*G06F 9/44* (2006.01)

(56) References Cited

U.S. PATENT DOCUMENTS

2003/0130029 A1* 7/2003 Crumby ............... G07C 15/006 463/20
2005/0043088 A1 2/2005 Nguyen et al.
2011/0223991 A1 9/2011 Powell et al.

FOREIGN PATENT DOCUMENTS

| | | |
|---|---|---|
| CN | 101464798 A | 6/2009 |
| CN | 102063285 A | 5/2011 |
| TW | 200950857 A | 12/2009 |

OTHER PUBLICATIONS

Tencent Technology, IPRP, PCT/CN2013/083345, Mar. 17, 2015, 5 pgs.

* cited by examiner

DISPLAY CONTROL METHOD AND DEVICE

RELATED APPLICATIONS

This application is a continuation application of PCT Patent Application No. PCT/CN2013/083345, entitled "DISPLAY CONTROL METHOD AND DEVICE" filed on Sep. 11, 2013, which claims priority to Chinese Patent Application No. 201210338434.3, "Display Control Method and Device," filed on Sep. 13, 2012, both of which are hereby incorporated by reference in their entirety.

FIELD OF THE INVENTION

The present invention generally relates to network technology, in particular to display control methods and devices involving network technology.

BACKGROUND OF THE INVENTION

Nowadays, users are no longer satisfied with using unconnected computers for work and/or entertainment. In general, users desire to experience more interaction and communication during such activities.

To improve interaction and communication, users rely on the internet and other network technologies to get connected. In the existing technology, users may install application programs for work and/or entertainment on the user-end terminals. Then, users may interact and coordinate with one another by running the application programs.

The existing technology, however, presents certain deficiencies: for every run, the same application program invokes the same commands and displays the same contents during operation, making user experience less exciting.

SUMMARY

The above deficiencies and other problems associated with the existing technology are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system may receive a seed random number from a server and initializes a platform-independent random number generator based on the seed random number. The computer system may run an application program installed on the computer system and monitor the operation of the application program. When the application program invokes a platform-dependent random-processing command, the computer system may use the platform-independent random number generator to generate a first random number based on the seed random number. Then the computer system may perform the platform-dependent random-processing command using the first random number to generate display contents corresponding to the first random number and display the display contents.

Another aspect of the invention involves a computer system. The computer system includes memory, one or more processors, and one or more program modules stored in the memory and configured for execution by the one or more processors. The one or more program modules include: a receiving module configured to receive a seed random number from a server; an initialization module configured to initialize a platform-independent random number generator based on the seed random number; a monitoring module configured to run an application program installed on the computer system and monitor the operation of the application program; a control module configured to use the platform-independent random number generator to generate a first random number based on the seed random number when the application program invokes a platform-dependent random-processing command; a processing module configured to perform the platform-dependent random-processing command using the first random number to generate display contents corresponding to the first random number; and a display module configured to display the display contents.

Another aspect of the invention involves a non-transitory computer readable storage medium having stored therein instructions, which when executed by a computer system cause the computer system to: receive a seed random number from a server; initialize a platform-independent random number generator based on the seed random number; run an application program installed on the computer system; monitor the operation of the application program; use the platform-independent random number generator to generate a first random number based on the seed random number when the application program invokes a platform-dependent random-processing command; perform the platform-dependent random-processing command using the first random number to generate display contents corresponding to the first random number; and display the display contents.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 2:
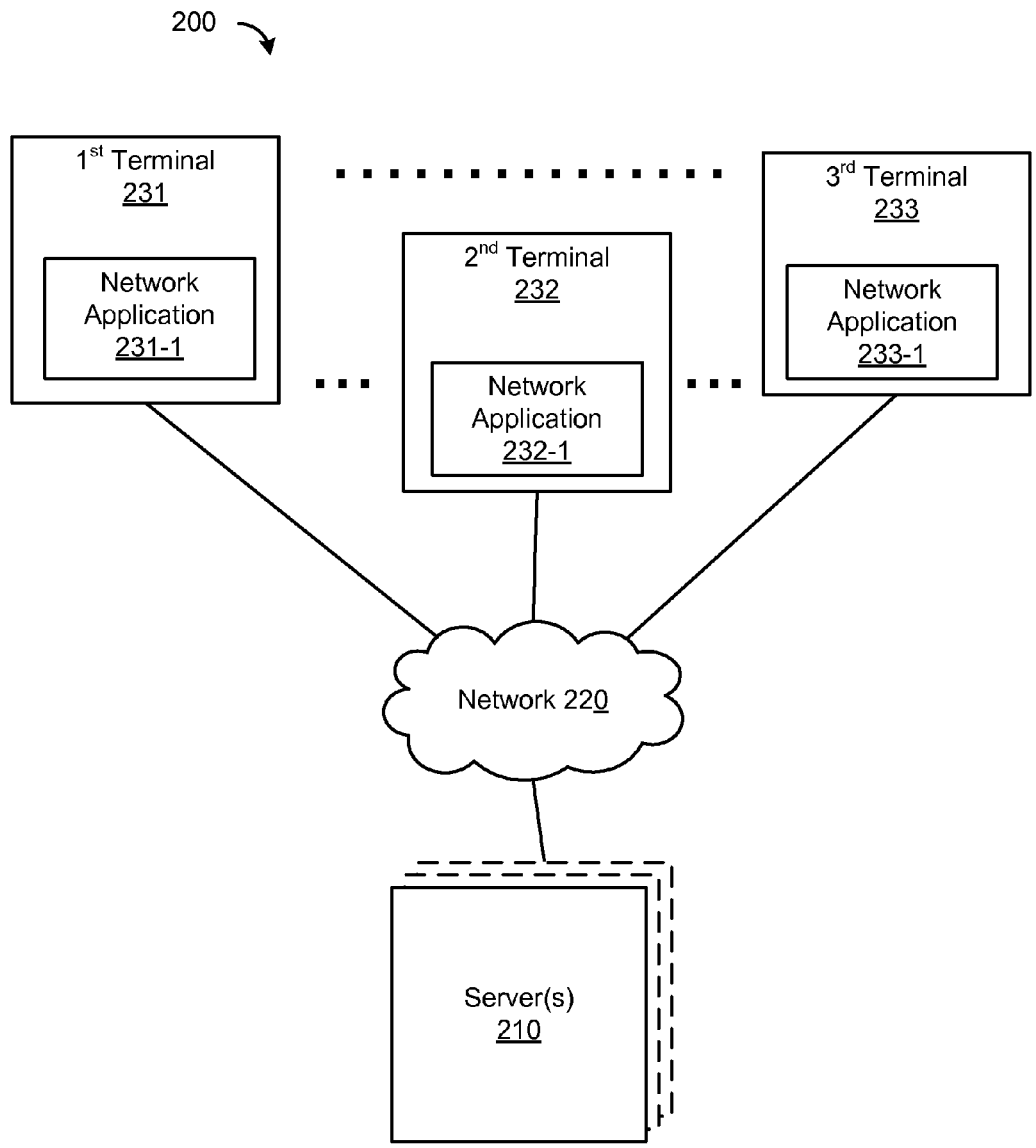
FIG. 2 is a network environment in accordance with some embodiments of the current invention.

FIG. 2 is a network environment in accordance with some embodiments of the current invention. The network environment 200 includes one or more servers 210 and a first terminal 231, a second terminal 232, and a third terminal 233. The terminals 231, 231, and 233 are connected to the server(s) 210 via a network 220 (e.g., the Internet), wherein the connections are managed and adjusted by network applications 231-1, 232-1, and 233-1, respectively. Meanwhile, the terminals may communicate with one another via the network 220. In some embodiments, the network environment 200 supports an on-line game application. Different users participate in the on-line game application from different terminals and the displays and operations of the various terminals are synchronized by the server and/or by a synchronizing terminal. The server 210 interacts with the terminals (231, 232, and 233) and provides seed random numbers to the terminals. Based on the specific network, users' preferences, and requirements of the applications, the number of servers and terminals may vary.

Figure 1:
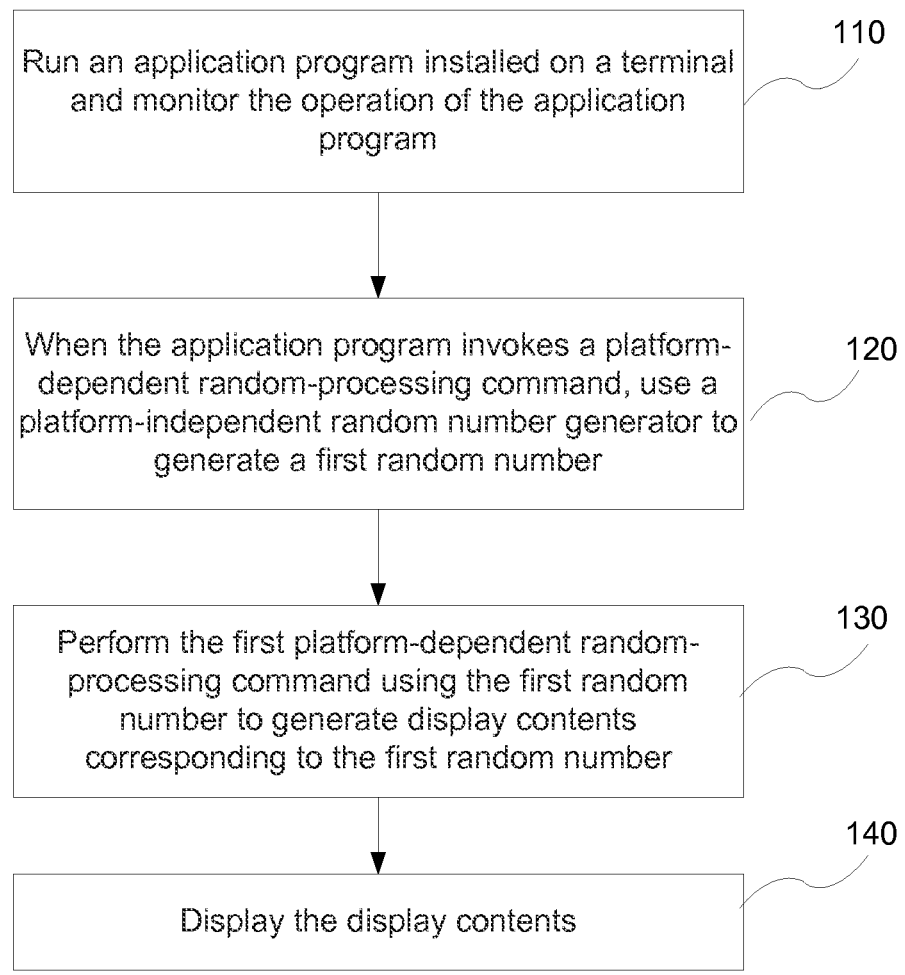
FIG. 1 is a flowchart illustrative of a display control method for randomization of display contents in accordance with some embodiments of the current invention.

FIG. 1 is a flowchart illustrative of a display control method for randomization of display contents in accordance with some embodiments of the current invention. For illustrative purposes, the current method may be implemented in a network application such as an on-line game application running at a computer system that includes the server and one or more terminals shown in FIG. 2.

According to FIG. 1, at step 110, the terminal may run an application program (e.g. an on-line game program) installed on the terminal and monitor the operation of the application program; at step 120, when the application program invokes a platform-dependent random-processing command, the terminal may use a platform-independent random number generator to generate a first random number; at step 130, the terminal may perform the platform-dependent random-processing command using the first random number to generate display contents corresponding to the first random number; and at step 140, the terminal may display the display contents.

Figure 3:
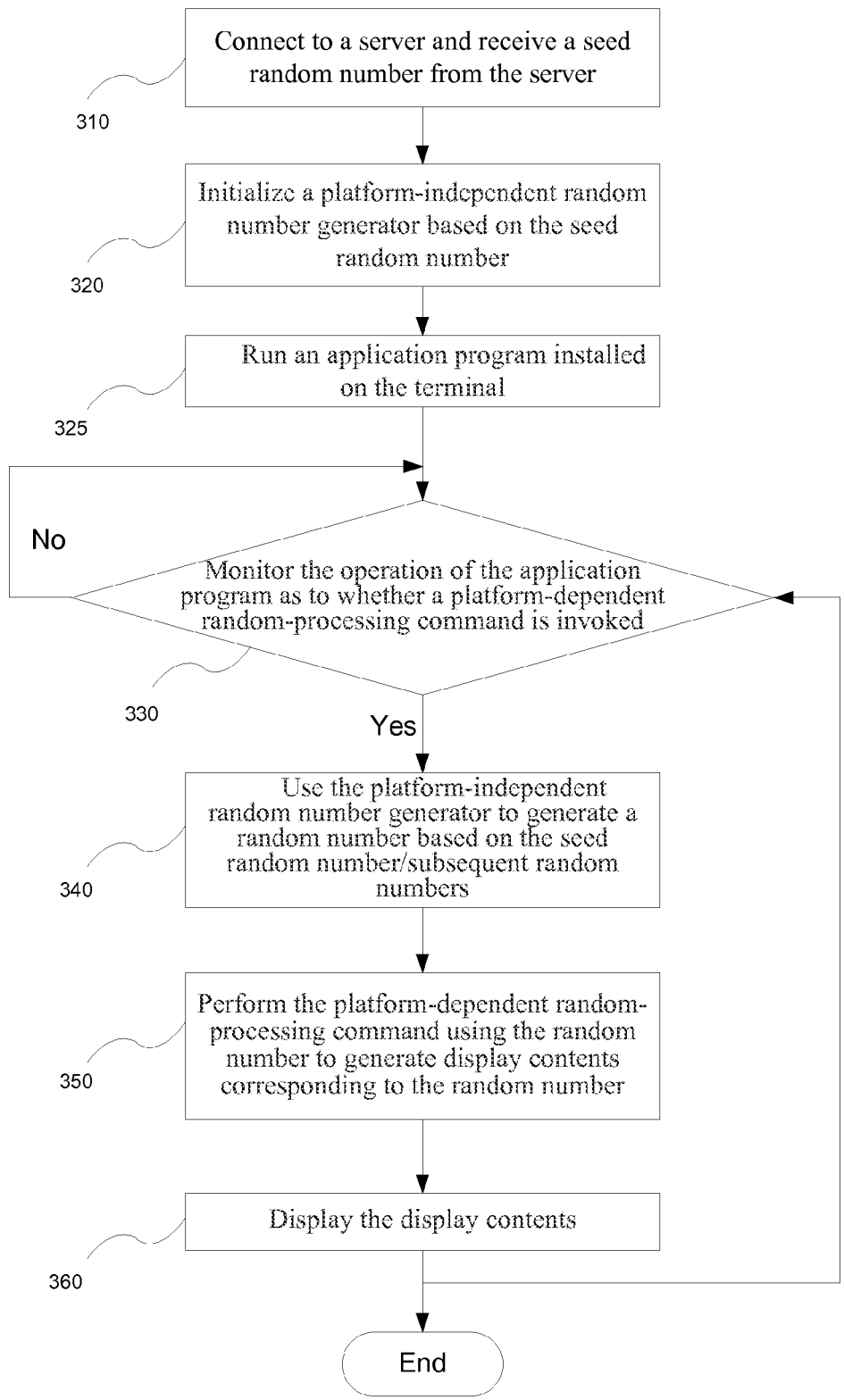
FIG. 3 is a more detailed flowchart illustrative of a display control method for randomization of display contents in accordance with some embodiments of the current invention.

FIG. 3 is a more detailed flowchart illustrative of a display control method for randomization of display contents in accordance with some embodiments of the current invention. Similarly, for illustrative purposes, the current method may be implemented in a network application such as an on-line game application running at a computer system that includes the server and one or more terminals shown in FIG. 2.

Figure 4:
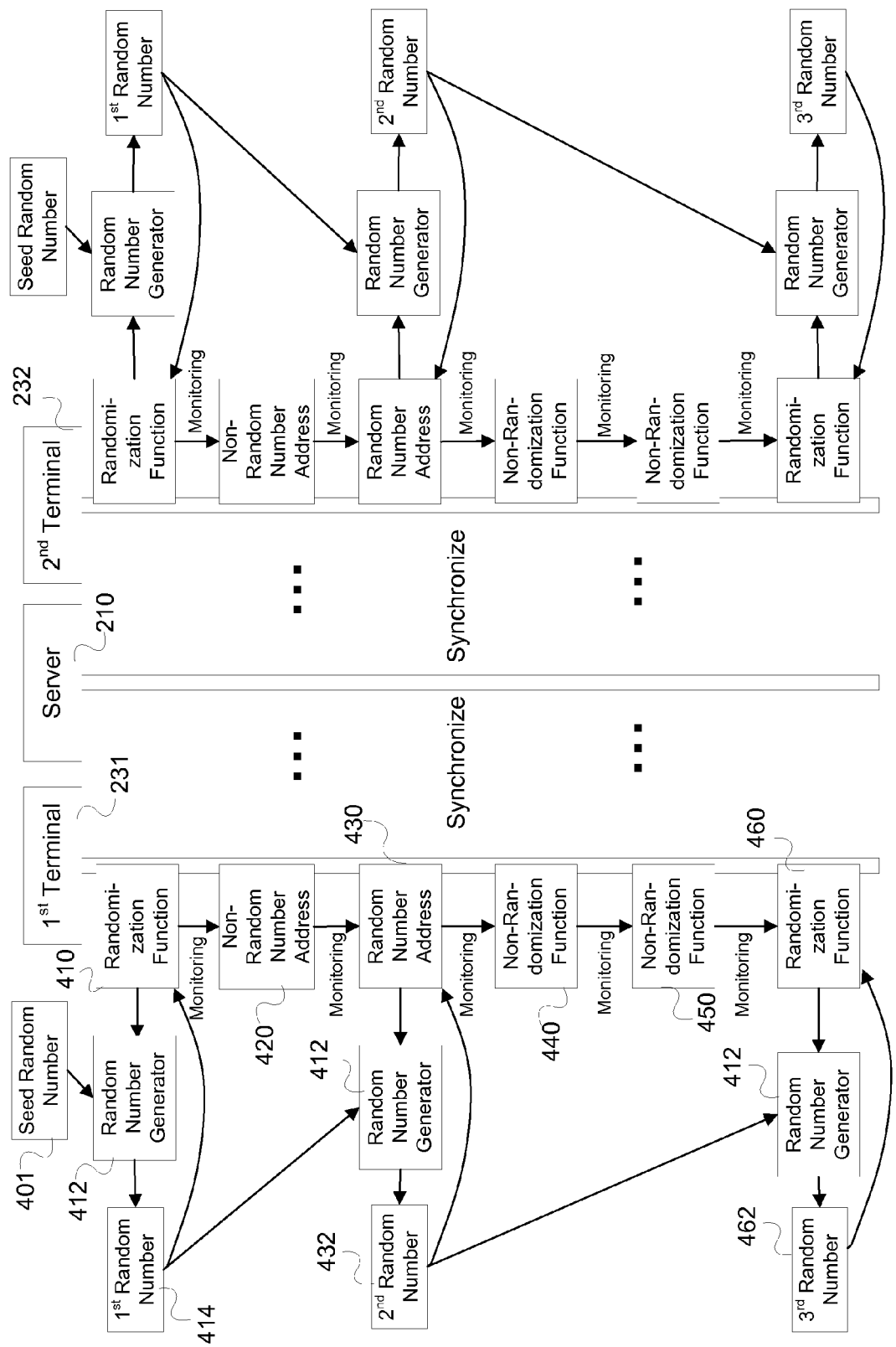
FIG. 4 is a schematic illustration of how a server and two user terminals interact and operate to achieve randomization of display contents in accordance with some embodiments of the current invention.

FIG. 4 is a schematic illustration of how a server 210 and two terminals (231 and 232) interact and operate to achieve randomization of display contents in accordance with some embodiments of the current invention. It should be noted that the number of computing devices (servers and terminals) implemented according to the current invention may vary based on the specific design and instant scenario of the application programs involved in the current method. For example, there may be one or any number of terminals. In addition, the server and one of the terminals may be the same or different devices. Since the first terminal 231 and the second terminal 232 are constantly synchronized in the illustration of FIG. 4, not all the operations and information items are marked to avoid redundancy. However, it should also be noted that the actual scenario and operation and performance of the server as well as the terminals may alter the flow of the example shown FIG. 4, making it necessary to provide more or less steps to ensure smooth integration and synchronization of the terminals.

Referring to FIG. 3, step 310 shows that the terminal may connect to a server via the internet or other network technologies. The terminal may then receive a seed random number from the server. For example, as shown in FIG. 4, the terminal 231 may connect to the server 210 and receive a seed random number 401 transmitted from the server 210 to the terminal 231. The seed random number may be produced by the server using any random number generating module, process, or tools. For example, the server may use the rand( ) function to produce the seed random number.

The server and the terminals may be computing devices connected by wired or wireless networks. Any kind of computing device may be used as servers and terminals. For example, the terminals may be personal computers such as laptops and desktops or mobile devices such as smart phones and tablets; the terminals may also be simulators, emulators, or virtual systems that are installed and embedded in the physical computing devices. The server may be any kind of computer capable of synchronizing and coordinating the operation of other computing devices. In some embodiments, the server may also be a device (e.g. a synchronizing terminal) running the application program (e.g. on-line game program) and participating in the alteration of the progression of the program.

Referring to FIG. 3, Step 320 shows that the terminal may initialize a platform-independent random number generator based on the seed random number. The platform-independent random number generator is independent from the application program. In some embodiments, the platform-independent random number generator is embedded in an emulator, a simulator, or a virtual system, which may provide operating environments for various application programs. Moreover, the platform-independent random number generator may be a function, a module, or a process that may be used to generate random numbers with an input, such as a seed random number. The seed random number may be any number. In some embodiments, the seed random number may be an integer between 0 and FFFFFFFF (hexadecimal notation). In some embodiments according to Step 320, the initialization step may set a starting point for the application program. In such cases, the initialized platform-independent random number generator may produce a random number (or other random information items) that is fed to the application program when the program starts to run. Due to the randomness of the seed random number, the starting point of the application program is also randomized. Thus, if there is no user input, each time when the application program is started, the program proceeds differently due to the different starting state, generating surprise and improving excitement for the users.

Referring to FIG. 3, Step 325 shows that the terminal may run an application program installed on the terminal. In some embodiments, the application program is running in an emulator, a simulator, or a virtual system. In some embodiments, the application program is an on-line gaming program. In some embodiment, multiple users may control the progression of the application program with user inputs such as mouse clicks, keyboard inputs, and/or touch screen inputs. The operation of the application program and the user inputs may invoke commands embedded in the application programs, and such commands may or may not involve randomization or random-processing.

Referring to FIG. 3, Step 330 shows that the terminal may monitor the operation of the application program as to whether a platform-dependent random processing command is invoked. If the platform-dependent random processing command is not invoked, the monitoring continues. If the platform-dependent random processing command is invoked, the terminal proceeds to the following steps. The platform-dependent random processing command may be any kind of commands dependent on the application program. In some embodiments, the platform-dependent random processing command involves a randomization function. In some embodiments, the platform-dependent random processing command involves a random number address.

Referring to FIG. 3, Step 340 shows that when a platform-dependent random processing command is invoked, the terminal may use the platform-independent random number generator to generate a random number (may be designated as the first random number) based on the seed random number. In some embodiments, the platform-independent random number generator may employ certain algorithms (e.g. using addition, subtraction, multiplication, division, and/or modulo) based on an input number (e.g. the seed random number) to obtain a resulting random number.

Referring to FIG. 4, when the application program running on the first terminal 231 invokes a randomization function 410, the platform-independent random number generator 412 is used to produce a first random number 414 based on the seed random number 401.

Referring to FIG. 3, Step 350 shows that after the random number is obtained, the terminal may perform the platform-dependent random processing command using the random number to generate display contents corresponding to the random number. The random number is generated by the platform-independent random number generator and fed to the application program so that the platform-dependent random processing command may be performed. In some embodiments, the platform-dependent random processing command requires the input random number to be within a certain range. For example, when the platform-dependent random processing command involves a random number address, the platform-dependent random processing command may mandate that the input number to be within the range of 0-215. The random number generated by the platform-independent random number generator may be further processed (e.g. using modulo) to fit into the range of the random number address. For instance, the random number may be processed to be 42, so that the number 42 is fed to the platform-dependent random processing command involving the random number address to produce display contents. Similarly, when the platform-dependent random processing command involves a randomization function such as a function to calculate damage in an on-line game, the randomization function may require that the input number be within a certain range, e.g. 0-215. The random number produced by the platform-independent random number generator may be further processed (e.g. using modulo) to generate an acceptable input number, e.g. 16. Then, the input number 16 may be used by the randomization function to calculate a damage value, e.g. 1.8.

Referring to FIG. 3, Step 360 shows that the terminal may display the display contents corresponding to the random number. After displaying the display contents, the user may choose to end the application program, thus ending the entire process. In some embodiments, however, Step 330 is repeated so that the terminal continues to monitor the operation of the application program. Whenever a platform-dependent random processing command is invoked, Steps 340, 350 and 360 are performed again. In some embodiments, the platform-independent random number generator may use different seed random numbers from the server, which produces such seed random numbers for each cycle. In some embodiment, the random number generated in the previous cycle may be used by the platform-independent random number generator, producing a random number that may be used by both the platform-dependent random processing command in the current cycle and the platform-independent random number generator in the next cycle.

Referring to FIG. 4, after the platform-independent random number generator 412 generates the first random number 414, the first random number 414 is returned to the randomization function 410 to produce display contents that may be displayed by the first terminal 231. The first terminal 231 continues to monitor the operation of the application program running on the first terminal 231. When the application program invokes commands not involving randomization, e.g. non-random number address 420, non-randomization function 440, and non-randomization function 450, the first terminal 231 does not engage the randomization process and does not use the platform-independent random number generator. When the application program invokes another platform-dependent random processing command, which involves random number address 430, the first random number 414 is fed to the platform-independent random number generator 412 to produce the second random number 432, which may be used by the random number address 430 to produce display contents. Similarly, when the application program invokes another platform-dependent random processing command, which involves randomization function 460, the second random number 414 may be used by the platform-independent random number generator 412 to produce the third random number 462, which may be used by the randomization function 460 to produce display contents.

It should be noted that the sequences shown in FIG. 4 are exemplary and many variations may take place. In some embodiments, the same platform-dependent random processing commands may be repeated. In some embodiments, a first platform-dependent random processing command may be followed by second and different platform-dependent random processing command. In addition, the terminals may or may not start running the application program at the same time. In some embodiments, the first terminal 231 and the second terminal 232 may start the same application program and each terminal receives the same seed random number from the server.

During the operation of the application program, the terminals are synchronized so that the terminals may display the same contents. In some embodiments, synchronization information such as logic frame values and user input collections from one terminal may be transferred by the server to the other terminals so that the other terminals may be synchronized. In some embodiments, the synchronization information may include random numbers generated by the platform-independent random number generator at one terminal and the random number is transferred and used by the other terminals to ensure synchronization. For example, if a second terminal starts to run the application program after a first terminal has executed one or more platform-dependent random processing commands, the second terminal may receive a random number that is generated by the platform-independent random number generator at the first terminal resulting from a chain of randomizations originally based on the seed random number. The second terminal may use the random number that is received start a sequence of randomizations for the application program and stay synchronized with the first terminal. In essence, the second terminal may feed the random number that is received into a platform-dependent random processing command to generate display contents that corresponds to the random number so that the display contents may be displayed by the second terminal.

For the same program session, for different terminals, the transmitted random number at a certain cycle (e.g. cycle N) is preferably the same so that the terminals may be properly synchronized. Even if there are delays resulted from regional differences and/or network deficiencies, the same sequence of random numbers for the terminals result in the same display contents for the terminals. FIG. 4, with the same sequence of performances by the first terminal 231 and the second terminal 232, illustrates how the terminals may execute the same platform-dependent random processing commands and display the same display contents, even if the contents are not displayed perfectly at the same time.

FIGS. 5-8 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the methods.

Figure 5:
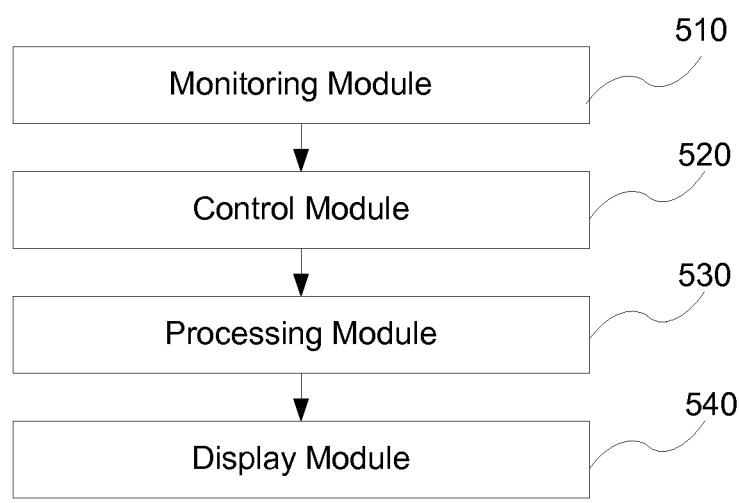
FIG. 5 is a block diagram illustrative of modules in a display control device capable of randomizing display contents in accordance with some embodiments of the current invention

FIG. 5 is a block diagram illustrative of modules in a display control device capable of randomizing display contents in accordance with some embodiments of the current invention. FIG. 5 shows: a monitoring module 510 configured to run an application program installed on a computer system and monitor the operation of the application program; a control module 520 configured to use the platform-independent random number generator to generate a first random number based on the seed random number when the application program invokes a platform-dependent random-processing command; a processing module 530 configured to perform the platform-dependent random-processing command using the first random number to generate display contents corresponding to the first random number; and a display module 540 configured to display the display contents.

Figure 6:
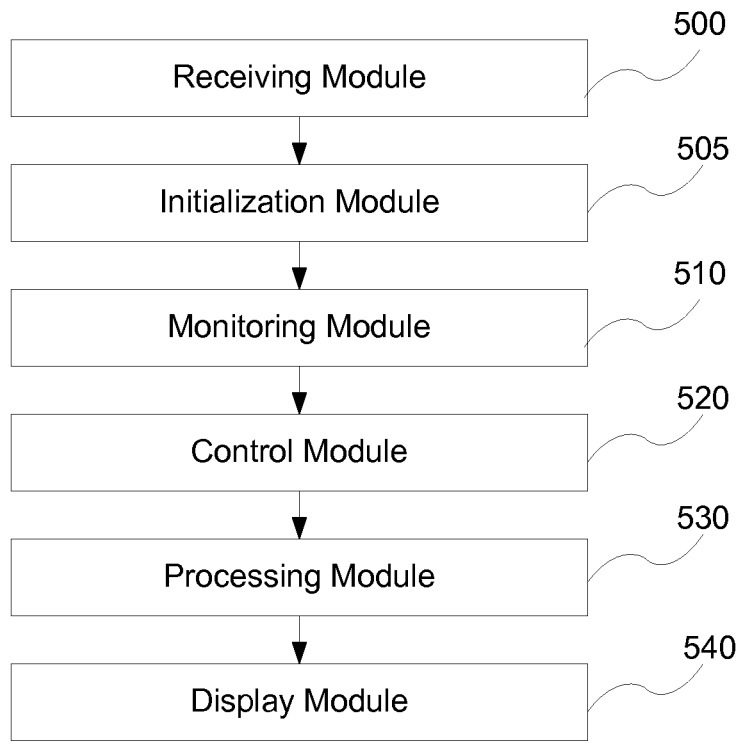
FIG. 6 is a more detailed block diagram illustrative of modules in a display control device capable of randomizing display contents in accordance with some embodiments of the current invention

FIG. 6 is a more detailed block diagram illustrative of modules in a display control device capable of randomizing display contents in accordance with some embodiments of the current invention. FIG. 6 shows: a receiving module 500 configured to receive a seed random number from a server; an initialization module 505 configured to initialize a platform-independent random number generator based on the seed random number; a monitoring module 510 configured to run an application program installed on a computer system and monitor the operation of the application program; a control module 520 configured to use the platform-independent random number generator to generate a first random number based on the seed random number when the application program invokes a platform-dependent random-processing command; a processing module 530 configured to perform the platform-dependent random-processing command using the first random number to generate display contents corresponding to the first random number; and a display module 540 configured to display the display contents.

Figure 7:
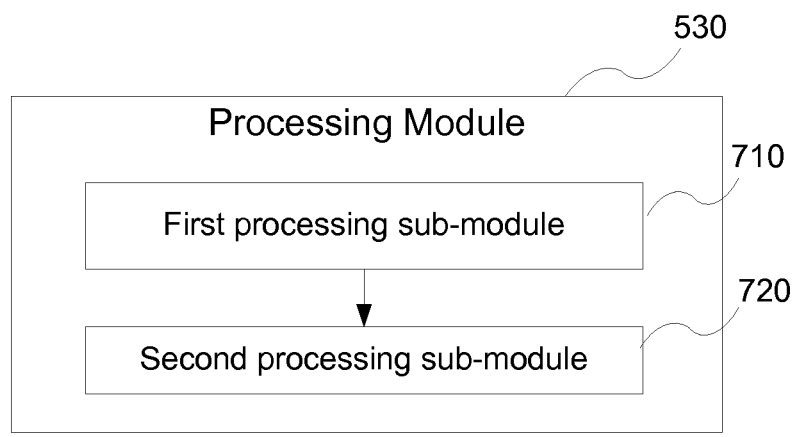
FIG. 7 is a block diagram illustrative of a processing module in the display control device in accordance with some embodiments of the current invention.

FIG. 7 is a block diagram illustrative of a processing module 530 in the display control device in accordance with some embodiments of the current invention. FIG. 7 shows that the processing module 530 may comprise: a first processing sub-module 710 configured to use a platform-dependent randomization function to generate the display contents based on the random number when the platform-dependent random-processing command comprises the platform-dependent randomization function; and a second processing sub-module 720 configured to use a platform-dependent random number address to generate the display contents based on the random number when the platform-dependent random-processing command comprises the platform-dependent random number address.

Figure 8:
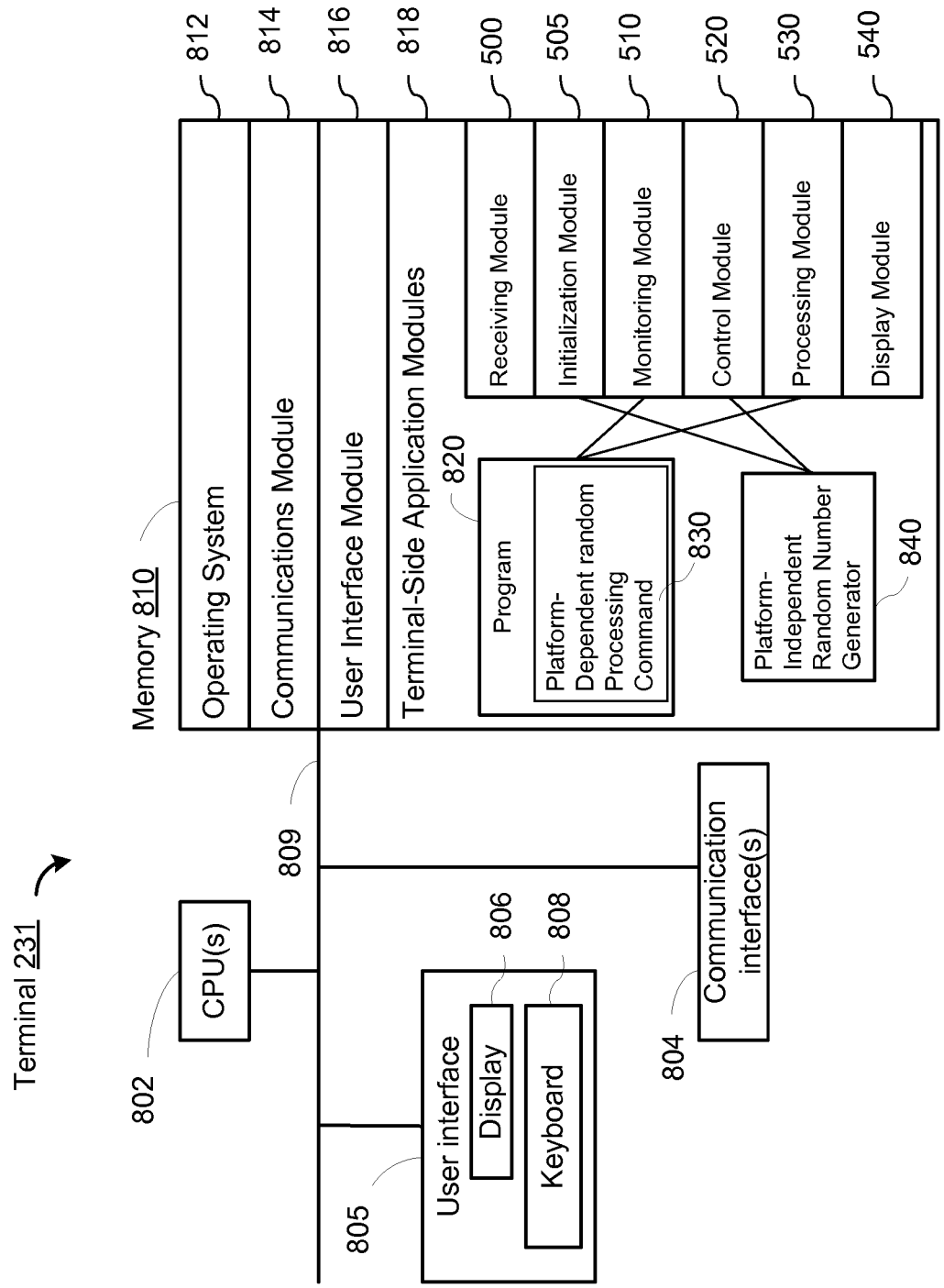
FIG. 8 is a block diagram of a terminal in accordance with some embodiments of the current invention.

FIG. 8 is a block diagram of a terminal 231 in accordance with some embodiments of the current invention. The exemplary terminal 231 typically includes one or more processing units (CPU's) 802, one or more network or other communications interfaces 804, memory 810, and one or more communication buses 808 for interconnecting these components. The communication buses 809 may include circuitry (sometimes called a chipset) that interconnects and controls communications between system components. The terminal 231 may include a user interface 805, for instance, a display 806 and a keyboard 808. When the terminal 231 is a smart phone or tablet, the user interface 805 may be a touch screen, which is both a display and an input device. Memory 810 may include high speed random access memory and may also include non-volatile memory, such as one or more magnetic disk storage devices. Memory 810 may include mass storage that is remotely located from the CPU's 802. In some embodiments, memory 810 stores the following programs, modules and data structures, or a subset or superset thereof:
- an operating system 812 that includes procedures for handling various basic system services and for performing hardware dependent tasks;
- a network communication module 814 that is used for connecting the server 810 to the synchronizing terminal, the participating terminals, and/or other computers via one or more communication networks (wired or wireless), such as the Internet, other wide area networks, local area networks, metropolitan area networks, and so on;
- a user interface module 816 configured to receive user inputs through the user interface 805;
- and a number of terminal-side application modules 818 including the following:
- a program 820 installed on the terminal 231 wherein the program 820 includes a number of commands including a number of platform-dependent random processing commands 830;
- a platform-independent random number generator 840 independent from the program 820, wherein the platform-independent random number generator 840 may be used to generate random numbers based on input numbers such as a seed random number;
- a receiving module 500 configured to receive a seed random number from a server;
- an initialization module 505 configured to initialize the platform-independent random number generator 840 based on the seed random number;
- a monitoring module 510 configured to run the program 820 installed on the terminal 231 and monitor the operation of the program 820;
- a control module 520 configured to use the platform-independent random number generator 840 to generate a first random number based on the seed random number when the program 820 invokes the platform-dependent random-processing command 830;
- a processing module 530 configured to perform the platform-dependent random-processing command 830 using the first random number to generate display contents corresponding to the first random number; and
- a display module 540 configured to display the display contents.

The current invention discloses methods and devices that provide controlled randomization of the progression of an application program on one or more terminals connected to a server. The server may feed a seed random number to the terminals and the seed random number may be used by a platform-independent random number generator to produce random numbers. The random numbers may be fed to platform-dependent random processing commands to generate display contents, which may be displayed by the terminals. With such implementations, the same program running at different times may have different processes and show different display contents. The current invention reduces predictability and improves randomness and excitability of the program.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for controlling a display on a first terminal connected to a server through a network, the method comprising:
   at the first terminal having one or more processors and memory storing programs executed by the one or more processors,
   receiving a seed random number from the server;
   initializing a platform-independent random number generator based on the seed random number;
   running an application program installed on the first terminal;
   monitoring the operation of the application program;
   when the application program invokes a first platform-dependent random-processing command, using the platform-independent random number generator to generate a first random number based on the seed random number;
   performing the first platform-dependent random-processing command using the first random number to generate display contents corresponding to the first random number;
   displaying the display contents;
   when the application program invokes a second platform-dependent random-processing command, using the platform-independent random number generator to generate a second random number based on the first random number;
   performing the second platform-dependent random-processing command using the second random number to generate display contents corresponding to the second random number; and
   displaying the display contents.

2. The method of claim 1, wherein:
the first platform-dependent random-processing command comprises a platform-dependent randomization function; and
the step of performing the first platform-dependent random-processing command comprises using the platform-dependent randomization function to generate the display contents based on the first random number.

3. The method of claim 1, wherein:
the first platform-dependent random-processing command comprises a platform-dependent random number address; and
the step of performing the first platform-dependent random-processing command comprises using the platform-dependent random number address to generate the display contents based on the first random number.

4. The method of claim 1, wherein:
a second terminal is connected to the server through a network;
when the application program starts to run on the second terminal, the second terminal receives a random number generated by the platform-independent random number generator, wherein:
   the random number is generated by a chain of randomizations based on the seed random number.

5. The method of claim 4, wherein:
the second terminal performs a platform-dependent random-processing command using the random number to generate display contents corresponding to the random number; and
the second terminal displays the display contents corresponding to the random number.

6. The method of claim 1, wherein:
a second terminal is connected to the server through a network; and
when the application program starts to run on the second terminal, display contents on the second terminal are synchronized with display contents on the first terminal.

7. A computer system, comprising a server and a first terminal, the first terminal having:
one or more processors;
memory; and
one or more programs modules stored in the memory and configured for execution by the one or more processors, the one or more program modules including:
a receiving module configured to receive a seed random number from the server;
an initialization module configured to initialize a platform-independent random number generator based on the seed random number;
a monitoring module configured to run an application program installed on the first terminal and monitor the operation of the application program;
a control module configured to use the platform-independent random number generator to generate a first random number based on the seed random number when the application program invokes a first platform-dependent random-processing command;
a processing module configured to perform the first platform-dependent random-processing command using the first random number to generate display contents corresponding to the first random number;
and a display module configured to display the display content;
wherein:
the control module is further configured to use the platform-independent random number generator to generate a second random number based on the first random number when the application program invokes a second platform-dependent random-processing command; and
the processing module is further configured to perform the second platform-dependent random-processing command using the second random number to generate display contents corresponding to the second random number.

8. The computer system of claim 7, wherein:
the first platform-dependent random-processing command comprises a platform-dependent randomization function;
the processing module further comprises a first processing sub-module; and
the first processing sub-module is configured to use the platform-dependent randomization function to generate the display contents based on the first random number.

9. The computer system of claim 7, wherein:
the first platform-dependent random-processing command comprises a platform-dependent random number address;
the processing module further comprises a second processing sub-module; and the second processing sub-module is configured to use the platform-dependent random number address to generate the display contents based on the first random number.

10. The computer system of claim 7, further comprising:
a second terminal connected to the server through a network, wherein:
the second terminal comprises a second receiving module configured to receive a random number generated by the platform-independent random number generator when the application program starts to run on the second terminal, wherein:
the random number is generated by a chain of randomizations based on the seed random number.

11. The computer system of claim 10, wherein:
the second terminal further comprises a second processing module and a second display module, wherein:
the second processing module is configured to perform a platform-dependent random-processing command using the random number to generate display contents corresponding to the random number; and
the second display module configured to display the display contents corresponding to the random number.

12. The computer system of claim 7, further comprising:
a second terminal is connected to the server through a network, wherein
when the application program starts to run on the second terminal, display contents on the second terminal are synchronized with display contents on the first terminal.

13. A non-transitory computer readable storage medium having stored therein one or more instructions, which, when executed by a first terminal, cause the first terminal to:
receive a seed random number from the server;
initialize a platform-independent random number generator based on the seed random number;
run an application program installed on the first terminal;
monitor the operation of the application program;
use the platform-independent random number generator to generate a first random number based on the seed random number when the application program invokes a first platform-dependent random-processing command;
perform the first platform-dependent random-processing command using the first random number to generate display contents corresponding to the first random number; and
display the display contents;
use the platform-independent random number generator to generate a second random number based on the first random number when the application program invokes a second platform-dependent random-processing command;
perform the second platform-dependent random-processing command using the second random number to generate display contents corresponding to the second random number; and
display the display contents.

14. The non-transitory computer readable storage medium of claim 13, wherein:
the first platform-dependent random-processing command comprises a platform-dependent randomization function; and
the instructions to cause the first terminal to perform the first platform-dependent random-processing command further comprises:

using the platform-dependent randomization function to generate the display contents based on the first random number.

15. The non-transitory computer readable storage medium of claim 13, wherein:
the first platform-dependent random-processing command comprises a platform-dependent random number address; and
the instructions to cause the first terminal to perform the first platform-dependent random-processing command further comprises:
using the platform-dependent random number address to generate the display contents based on the first random number.

16. The non-transitory computer readable storage medium of claim 13, wherein:
the instructions, when executed by a second terminal connected to the server through a network, further cause the second terminal to:
run the application program on the second terminal,
receive a random number generated by the platform-independent random number generator, wherein:
the random number is generated by a chain of randomizations based on the seed random number.

17. The non-transitory computer readable storage medium of claim 16, wherein the instructions further causes the second terminal to:
perform a platform-dependent random-processing command using the random number to generate display contents corresponding to the random number; and
display the display contents.

* * * * *